Dec. 1, 1925.
A. A. S. STUART
1,563,674
SURGICAL KNIFE
Filed Sept. 8, 1924
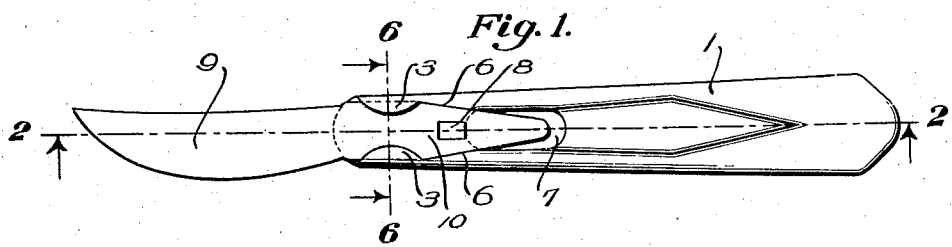
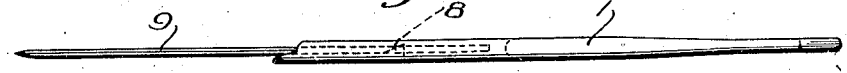
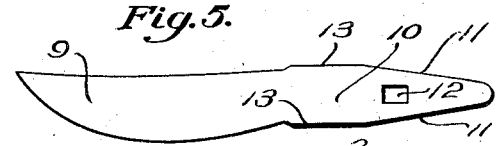
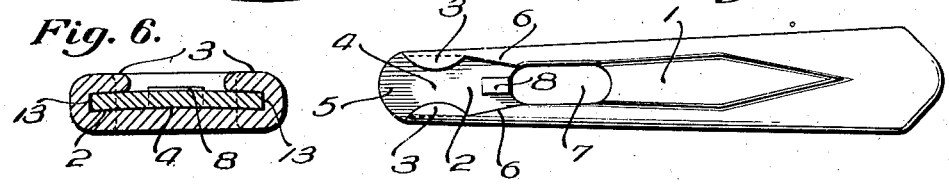
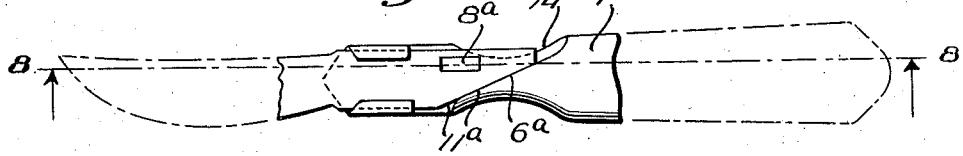
INVENTOR
Alexander A. S. Stuart.
BY
ATTORNEYS Patented Dec. 1, 1925.

1,563,674

UNITED STATES PATENT OFFICE.

ALEXANDER A. S. STUART, OF BETHLEHEM, PENNSYLVANIA.

SURGICAL KNIFE.

Application filed September 8, 1924. Serial No. 736,669.

*To all whom it may concern:*

Be it known that I, ALEXANDER A. S. STUART, a citizen of the United States, and resident of the city of Bethlehem, in the county of Northampton and State of Pennsylvania, have invented certain new and useful Improvements in Surgical Knives, of which the following is a specification.

The main object of this invention is to simplify and improve the construction of surgical knives having detachable blades.

In the drawing, Fig. 1 is a side elevation of a knife constructed in accordance with this invention;

Fig. 2 a longitudinal sectional view taken on the line 2—2 of Fig. 1;

Fig. 3 an edge view of the knife;

Fig. 4 a detail plan view of the knife handle, the blade being detached;

Fig. 5 a detail view of the knife blade detached;

Fig. 6 a transverse sectional view taken on the line 6—6 of Fig. 1;

Fig. 7 a detail view showing a slightly modified form of the knife;

Fig. 8 a longitudinal sectional view taken on the line 8—8 of Fig. 7;

Fig. 9 a detail view showing a further modified form of the knife; and

Fig. 10 a longitudinal sectional view taken on the line 10—10 of Fig. 9.

Referring to the various parts by numerals, 1 designates the knife handle which is preferably formed of one piece of suitable metal. The handle is comparatively thin and flat, but of course it may be of any suitable shape to adapt it to the use for which it is designed. The blade-receiving end of the handle is cut away longitudinally to form the comparatively thin, flat blade-supporting portion 2. Overlying the longitudinal edges of the blade-supporting portion are two oppositely disposed blade-retaining flanges 3. Between the inner margins of these flanges the blade-supporting surface 2 is curved slightly as indicated in Fig. 6. The blade-receiving end of the handle is extended slightly beyond the outer ends of the flanges 3 to form a blade-receiving lip 5. As clearly shown in the drawing this blade-receiving lip 5 extends slightly beyond the flanges 3 in order to receive the end of the blade and guide it under the flanges, as will be hereinafter described. The flanges 3 are off-set from the blade-receiving surface 2 slightly, preferably just the thickness of the tail-piece of the blade, as clearly shown in Fig. 6. The handle is formed with two converging walls or shoulders 6 which extend inwardly from the inner ends of the flanges 3. These converging walls form angular stops against which the marginal edges of the tail-piece of the blade abut. At the inner end of the blade-supporting surface 2 the handle is cut out to form a large aperture 7, and the converging walls 6 terminate at the margin of this aperture as clearly shown in Fig. 4. Near the inner end of the blade-supporting surface 2 is formed a rigid catch lug 8, said lug increasing in thickness from its outer end to its inner end, its inner end being square to form a square locking shoulder.

The blade 9 is formed with a long tail-piece 10. The free end of this tail-piece is tapered, the converging edges 11 thereof being adapted to abut squarely against the converging shoulders 6 of the handle. The tail-piece is formed with an aperture 12 which is adapted to receive the locking lug 8. The substantially parallel edges 13 of the tail-piece fit under the flanges 3 and preferably bear against the transverse wall of the groove formed by the inturned flanges 3. The extreme end of the tail-piece lies within the aperture 7 when the blade is in position in the handle. The blade is preferably formed of thin spring steel so that the end of the tail-piece 10 will ride over the locking lug 8 and when the aperture 12 registers with said lug the tail-piece will snap inwardly and lie flat against the blade-supporting surface 2 and interlock with the lug 8. Because of the flexibility of the tail-piece of the blade it will be slightly bowed, as shown in Fig. 6, between the flanges 3 and will be securely held therein against transverse or sidewise motion. The locking lug will hold the blade against strain tending to withdraw it from the handle. The converging shoulders 6 will hold the blade against any strain tending to force it into the handle beyond its locked position. When inserting the blade into the handle it is only necessary to rest the tip of the tail-piece on the lip 5 and to then slide it inwardly under the flanges 3. The lip 5 and the flanges 3 serve as a means for guiding the blade into its locked position. The flanges 3 form a rigid blade-holding means.

When it is desired to detach the blade from the handle the operator inserts a finger in the aperture 7 and bends the tail piece of the blade laterally or sidewise sufficiently to free it from the locking lug. The blade may then be readily drawn outwardly and detached from the handle. It is obvious that a blade shaped as shown in Figs. 1 and 5 may be placed in the handle with either side next to the blade supporting surface. The blade may therefore be quickly adjusted to the handle. This is very important.

As shown in Fig. 7 the handle is formed with one diagonally arranged stop flange 6ª. The tail piece of the blade is formed with one correspondingly arranged oblique edge 11ª adapted to engage the flange 6ª. The handle is formed with a cut-out 14 along one edge to expose one edge of the tail piece of the blade. To detach this blade it is only necessary to place the finger on the exposed edge of the tail piece of the blade and press it laterally or sidewise to free it from the locking lug 8ª.

In the form of the device illustrated in Figs. 9 and 10 the tail piece of the blade slides in under an inwardly turned latch 15. To detach the blade, in this construction, it is only necessary to press the tail piece inwardly sufficiently to free it from the locking lug, the handle part being properly shaped to allow the necessary flexing of the tail piece of the blade for this purpose.

What I claim is:

1. A knife comprising a handle formed at its blade-receiving end with a blade-receiving portion of less thickness than the body of the handle, inwardly extending flanges along the edges of said blade-receiving portion to form blade-receiving grooves, a rigid locking stop projecting from the inner portion of said blade-receiving portion, an aperture being formed through the handle inwardly beyond the locking stop, and a blade formed with a tail-piece adapted to fit snugly in the grooves formed by the said flanges on the handle and provided with an opening to receive the locking stop on the handle, the end of said tail-piece lying within the aperture in the handle when the blade is locked in position.

2. A knife comprising a handle formed at its blade-receiving end with a blade-receiving portion, inwardly extending flanges along the edges of said blade-receiving portion to form blade-receiving grooves, a rigid locking stop projecting from said blade-receiving portion, a portion of the handle inwardly beyond the locking stop being cut away, and a blade formed with a tail-piece adapted to fit snugly in the grooves formed by the said flanges on the handle and provided with an opening to receive the locking stop on the handle, a portion of said tail-piece lying within the cut-out part of the handle when the blade is locked in position.

3. A knife comprising a handle formed at its blade-receiving end with a blade-receiving portion, inwardly extending flanges along the edges of said blade-receiving portion to form blade-receiving grooves, a locking stop adjacent said blade-receiving portion of the handle, and a blade formed with a tail-piece adapted to fit snugly in the grooves formed by the said flanges on the handle and provided with an opening to receive the locking stop on the handle, the end of said tail-piece being free to be flexed to release it from the locking stop.

4. A knife comprising a handle formed at one end with a blade-receiving portion, a rigid locking stop projecting from said blade-receiving portion, a portion of the handle inwardly beyond the locking stop being cut away, and a blade formed with a tail piece adapted to fit in the blade-receiving portion and provided with an opening to receive the locking stop, a portion of said tail piece overlying the said cut away portion of the handle when the blade is locked in position and the blade-receiving portion being formed to engage and extend transversely around the opposite longitudinal edges of the tail-piece and to bear upon one face of the tail piece and hold it flexed between said engaged edges, whereby the tail piece is firmly held in the blade-receiving portion.

5. A knife comprising a handle formed at its blade-receiving end with a blade-receiving portion of less thickness than the body of the handle, rigid blade-holding means formed on the handle near the outer end of the blade-receiving portion, a rigid locking stop projecting from the inner portion of said blade-receiving portion, an aperture being formed through the handle inwardly beyond the locking stop, and a blade formed with a tail-piece adapted to fit snugly in the blade-holding means on the handle and provided with an opening to receive the locking stop on the handle, the end of said tail-piece lying within the aperture in the handle when the blade is locked in position.

6. A knife comprising a handle formed at its blade-receiving end with a blade-receiving portion of less thickness than the body of the handle, inwardly extending flanges along the edges of said blade-receiving portion to form blade-receiving grooves, a rigid locking stop projecting from the inner portion of said blade-receiving portion, a diagonal stop shoulder formed on the handle, an aperture being formed through the handle inwardly beyond the locking stop, and a blade formed with a tail-piece adapted to fit snugly in the grooves formed by the said flanges on the handle and provided with an opening to receive the locking stop on the handle, the end of said tail-piece lying within the aperture in the handle when the blade is locked in position and one edge of said tail-piece engaging the diagonal shoulder on the handle to limit the inward sliding movement of the blade.

7. A knife comprising a handle formed at its blade-receiving end with a blade-receiving portion of less thickness than the body of the handle, inwardly extending flanges along the edges of said blade-receiving portion to form blade-receiving grooves, a rigid locking stop projecting from the inner portion of said blade-receiving portion, two converging diagonal stop shoulders formed on the handle, an aperture being formed through the handle inwardly beyond the locking stop, and a blade formed with a tapered tail-piece adapted to fit snugly in the grooves formed by the said flanges on the handle and provided with an opening to receive the locking stop on the handle, the end of said tail-piece lying within the aperture in the handle when the blade is locked in position and the edges of the tapered part of the tail-piece engaging the two diagonal shoulders on the handle to limit the inward sliding movement of the blade.

8. A knife comprising a handle formed at its blade-receiving end with a blade-receiving portion of less thickness than the body of the handle, rigid blade-holding means formed on the handle near the outer end of the blade-receiving portion, a rigid locking stop projecting from the inner portion of said blade-receiving portion, two converging diagonal stop shoulders formed on the handle, an aperture being formed through the handle inwardly beyond the locking stop, and a blade formed with a tapered tail-piece adapted to fit snugly in the blade-holding means on the handle and provided with an opening to receive the locking stop on the handle, the end of said tail-piece lying within the aperture in the handle when the blade is locked in position and the edges of the tapered part of the tail-piece engaging the two diagonal shoulders on the handle to limit the inward sliding movement of the blade.

In testimony whereof I hereunto affix my signature.

ALEXANDER A. S. STUART.